United States Patent
Chang (10) Patent No.: US 9,820,602 B2
(45) Date of Patent: Nov. 21, 2017

(54) STEAM HEATING BOILER (71) Applicant: Rong-Kuan Chang, Taoyuan County (TW)

(72) Inventor: Rong-Kuan Chang, Taoyuan County (TW)

( * ) Notice: Subject to any disclaimer, the term of this patent is extended or adjusted under 35 U.S.C. 154(b) by 372 days.

(21) Appl. No.: 14/549,486

(22) Filed: Nov. 20, 2014

(65) Prior Publication Data
US 2016/0143472 A1   May 26, 2016

(51) Int. Cl.
A47J 27/04   (2006.01)

(52) U.S. Cl.
CPC ........ *A47J 27/04* (2013.01); *A47J 2027/043* (2013.01)

(58) Field of Classification Search
CPC ......... F22B 13/023; F01K 17/02; A47J 27/04; A47J 2027/043; F24H 1/181
See application file for complete search history.

(56) References Cited

U.S. PATENT DOCUMENTS

| | | | | |
|---|---|---|---|---|
| 216,667 A * | 6/1879 | Forbes | .................... | F22B 11/00 122/42 |
| 1,050,452 A * | 1/1913 | Griffin | .................... | A47J 27/04 126/369 |
| 3,212,426 A * | 10/1965 | Lewus | .................... | A47J 27/04 126/369 |
| 3,502,065 A * | 3/1970 | Lassiter | .................. | A47J 27/04 123/143 R |
| 4,509,412 A * | 4/1985 | Whittenburg | ........... | A47J 27/04 126/20 |
| 2005/0051036 A1* | 3/2005 | Erdmann | ................ | A47J 27/04 99/415 |

* cited by examiner

*Primary Examiner* — Daniel J Colilla (57) ABSTRACT

The present invention is to provide a steam heating boiler, which can be implemented by combining steam table and steam cabinet; said boiler includes a hollow upper groove thereabove and a hollow bottom groove therebelow; the top opening of said upper groove is sealed, and the volume of the hollow bottom groove protruded downwardly from the lower part of the said upper groove, the upper part of said bottom groove communicated with the lower part of the upper groove, and the lower part of said bottom groove is sealed, so that water can flow freely inside the upper groove and bottom groove.

5 Claims, 10 Drawing Sheets

STEAM HEATING BOILER

BACKGROUND OF INVENTION

1. Field of the Invention

The present invention relates generally to a steam heating boiler, and more particularly to a steam heating boiler which can be used with a steam table or a steam cabinet for steam cooking dumplings, cakes, buns, bread and other foods.

2. Description of Related Art

The conventional steam cabinets and steam tables all have boilers. For example, in the embodiment of U.S. Pat. No. 6,098,527, the inside boiler (3) contained a heating space that has multiple horizontally set heated tubes (311, 312). Said heated tube communicated with the inner wall of boiler (3). When the gas burner was placed under boiler (3) to heat up the heated tubes (311, 312) by flame, the bottom of boiler (3) and the water inside heated tube (311, 312) would gradually warm up to the boiling point to generate steam for the cooking of foods. Said heated tube could increase the heated area, thus, allowed the water to boil more quickly. In said embodiment, the heated tubes were horizontally placed. In addition to horizontal placement, there were other methods to expand the heated area to shorten the time for heating to boiling, thus saving fuel costs and reducing the burden on the industry.

Moreover, the combustion gas emitted inside the heating space of boiler (3) could be barely discharged, thus, the exhaust pipe (323) was installed to discharge the exhaust gas. However, as the exhaust pipe (323) should be installed on the inner wall of the steam table or steam cabinet, the processing was difficult and time-consuming, while increasing the cost. Hence, simplifying the process of installing exhaust pipe is useful.

SUMMARY OF THE INVENTION

The objective of the present invention is to provide a steam heating boiler that can shorten heating time, rapidly boil to produce steam, thereby saving fuel costs and improving economic efficiency.

In order to solve the above-mentioned problems, the present invention provides a sealed boiler capable of being filled with water therein and discharge steam. Said boiler includes a hollow upper groove thereabove and a hollow lower groove therebelow. The volume of the upper part of said upper groove is larger than that of the lower part of said upper groove, and top opening of the upper groove is sealed. The volume of the hollow bottom groove protruded downwardly from said lower part of the upper groove. An upper part of said bottom groove communicated with said lower part of the upper groove, and an lower part of said bottom groove is sealed. Hence, water can flow freely inside the upper groove and bottom groove. Moreover, a concave heating space for fire heating formed at the external bottom of said bottom groove. The two features of the present invention are:

First: said bottom groove formed a rectangle-shaped water storage tank while looking upward, and the heating space is surrounded by the bottom groove into a concave closed space. Said heating space is provided with a hollow convex groove protruded downwardly from the bottom part of said upper groove. Said convex groove arranged longitudinally and connected with the upper groove. Both ends of said convex groove communicated with the upper and lower sides of the bottom groove. The heating space further includes heated tube perpendicularly crossed with the convex groove and communicated with each other. Both ends of the heated tube communicated with the left and right sides of the bottom groove, so that water can flow freely inside the convex groove and heated tube.

Second: said bottom groove protruded downwardly from the left and right side of the upper groove to open the front and rear ends of the concave heating space for forming an open space of air ventilation. Said heating space provided with a plurality of heated tubes disposed diagonally, whereat both ends of said heated tube are respectively communicated with the left and right sides of the bottom groove.

Regarding the first feature, the upper groove, bottom groove, and convex groove of said boiler fully communicate with the heated tube, so the water can flow freely inside. The hollow rectangle heating space at the external bottom of the bottom groove can collect heat after burning. A plurality of convex grooves and heated tubes can expand the heated area to effectively and rapidly conduct the temperature, so the water can be heated up to the boiling point and generate steam to shorten the heating time and save fuel.

Regarding the second feature, the upper groove and bottom groove of said boiler fully communicate with the heated tube, so that water can flow freely inside. The heated tubes are perpendicularly intersected to increase the heating area. The front and rear ends of the heating space are open, so that air can flow freely to intensify flame. Hence, without the settings of exhaust pipes, water can be heated up quickly to the boiling point and generate steam, thereby shortening heating time and saving fuel.

DETAILED DESCRIPTION OF THE INVENTION

Figure 1:
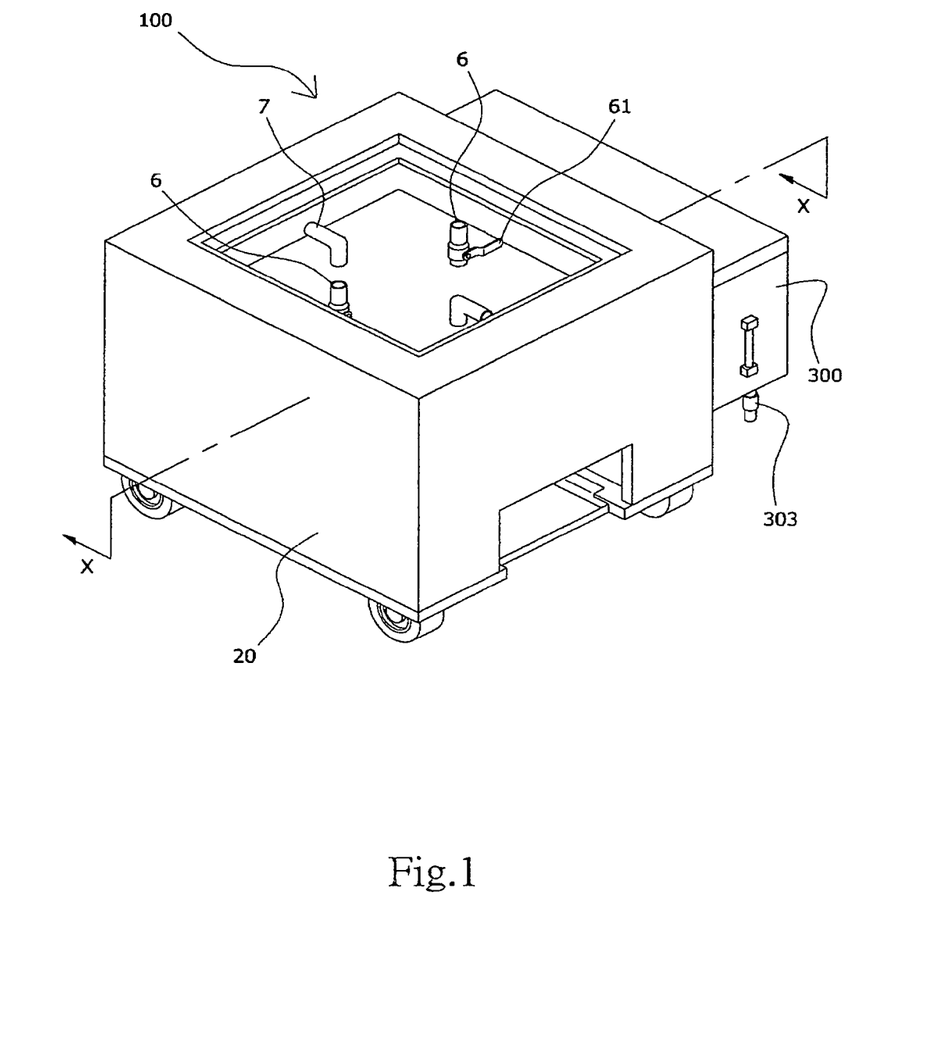
FIG. 1: is a schematic perspective view of steam table.
Figure 2:
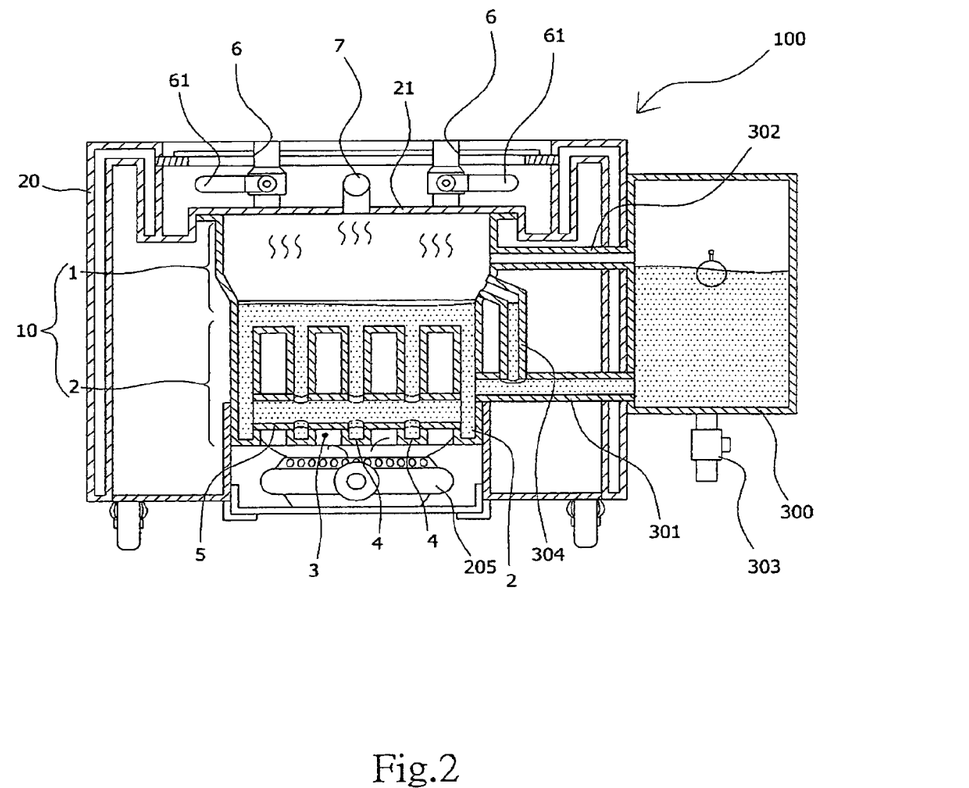
FIG. 2: is a X-X sectional view of FIG. 1, which is the sectional view of the first embodiment.
Figure 3:
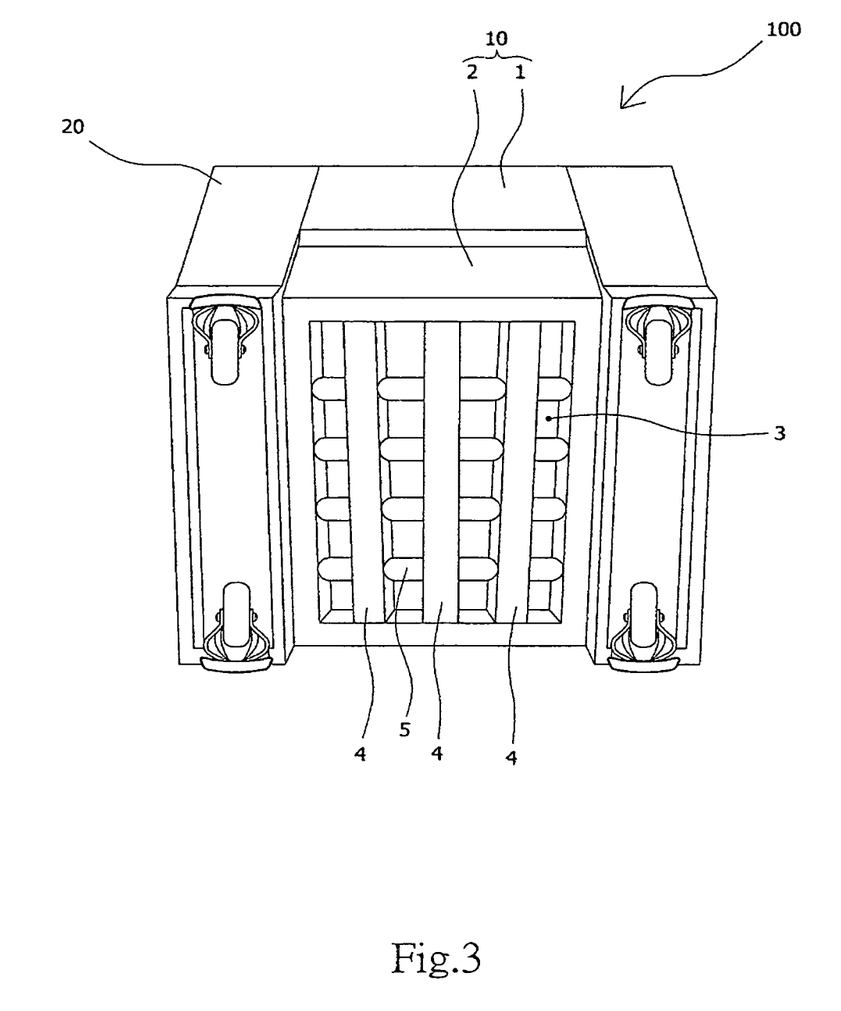
FIG. 3: is a bottom perspective view of steam table, which is the bottom perspective view of FIG. 2.

In accordance with the drawings, the present invention is as described in detail as follows:

FIGS. 1 to 3 illustrate the first embodiment of the present invention. A steam table (100) allowed a steamer (not illustrated), which could contain dumplings or rice cakes, to be placed on the table. The steam heats up the steamer to cook the dumplings or rice cakes.

Said steam table (100) has a sealed boiler (10) capable of being filled with water therein and discharge steam; said boiler (10) included a hollow upper groove (1) thereabove and a hollow bottom groove (2) therebelow; the volume of the upper part of said upper groove (1) being larger than the lower part of said upper groove (1), the volume of the hollow bottom groove (2) protruded downwardly from said lower part of the upper groove (1), the upper part of said bottom groove (2) communicated with the lower part of the upper groove (1), so that water can flow freely inside the upper groove (1) and bottom groove (2); moreover, a concave heating space (3) for fire heating formed at the external bottom of said bottom groove (2). Said structure is the same with the original embodiment and the structure that is not detailed herein.

In the present invention, referring to FIG. 3, the bottom groove (2) formed a rectangle-shaped water storage tank while looking upward, and the heating space (3) is surrounded by the bottom groove (2) into concave enclosed space; said heating space (3) is provided with a hollow convex groove (4) produced downwardly from the bottom part of said upper groove (1), said convex groove (4) arranged longitudinally and connected with the upper groove (1), and both ends of said convex groove (4) communicated with the upper and, lower sides of said bottom groove (2); the heating space (3) further included heated tubes (5) perpendicularly crossed with said convex groove (4) and communicated with each other; and both ends of the heated tube (5) communicated with the left and right sides of said bottom groove (2), so that water can flow freely inside the convex groove (4) and heated tubes (5).

Two or more convex grooves (4) are equally spaced in parallel; two or more heated tube (5) are equally spaced in parallel and perpendicularly crossed with the convex grooves (4). In this way, the convex groove (4) and heated tube (5) inside the heating space (3) are aligned for even distribution of flame.

Said boiler (10) is arranged inside a low cabinet (20), and the top opening of the upper groove (1) is closed by the top plate (21) of the low cabinet (20). Said low cabinet (20) engaged with an automatically filling tank 300 to form the steam table (100); the bottom part of said tank 300 communicated with the bottom groove (2) through a water filling pipe (301), said water filling pipe (301) communicated with the upper groove (1) through a pressure relief pipe 304, the upper part of said tank 300 communicated with the upper groove (1) through a vent pipe (302).

The top plate (21) of said low cabinet (20) includes at least one steam pipe 6 with adjustment value 61 and a steam release regulator pipe (7). When the steamer (not illustrated) is placed in the steam pipe (6,) the exhaust steam can heat up the food inside the steamer by steam heating.

For use, the gas burner (205) is placed below the bottom groove (2) at a distance to heat up the heating space (3). The heated tube (5) can be heated around the walls of the heating space (3), convex grooves (4), and heated tube (5) of the bottom groove (2) can be heated. With a large heated area, the water inside said boiler (10) can be rapidly boiled to generate steam. Compared to the conventional design, the present invention can shorten heating time and save fuel cost.

Figure 4:
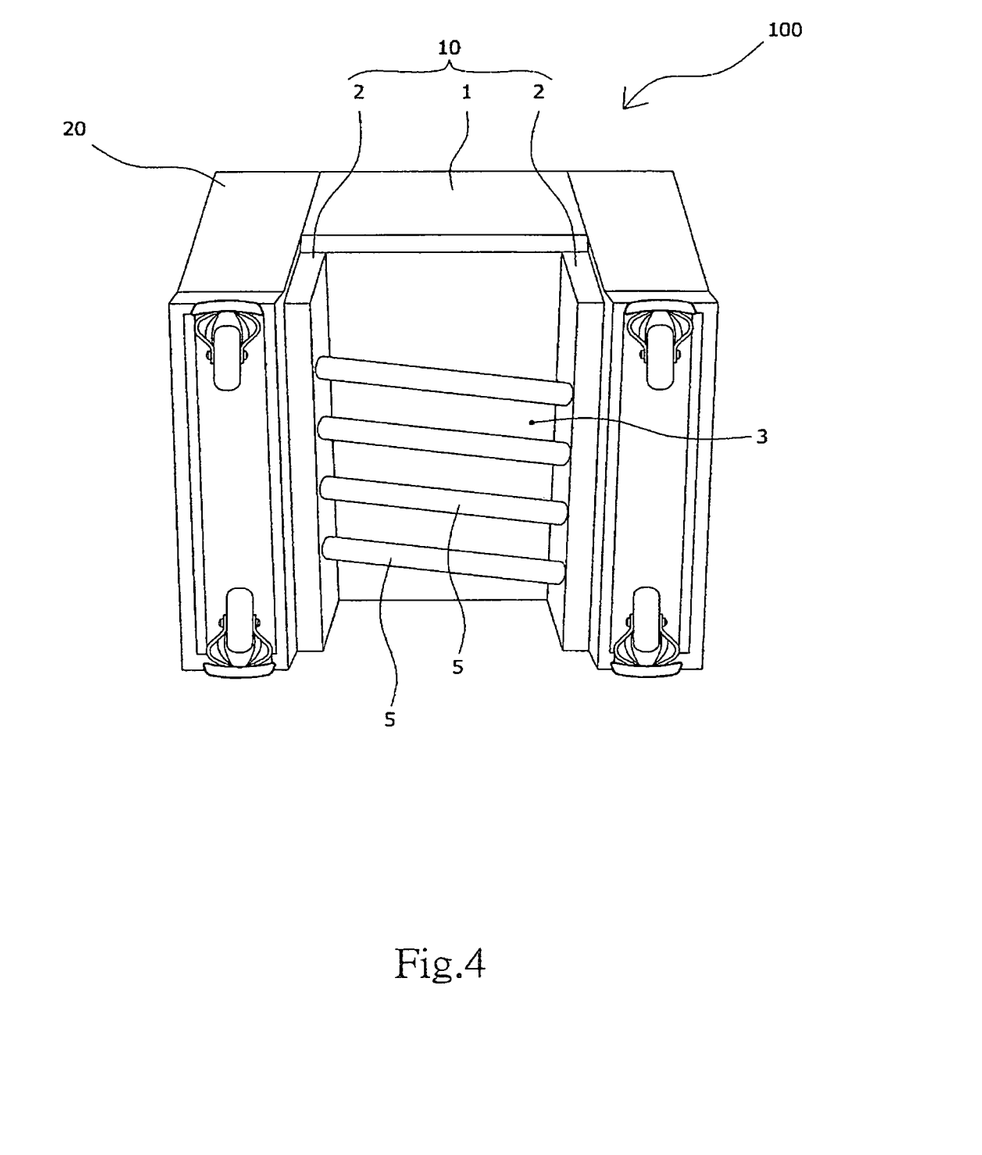
FIG. 4: is a bottom perspective view of steam table, which is the sectional view of the second embodiment.
Figure 5:
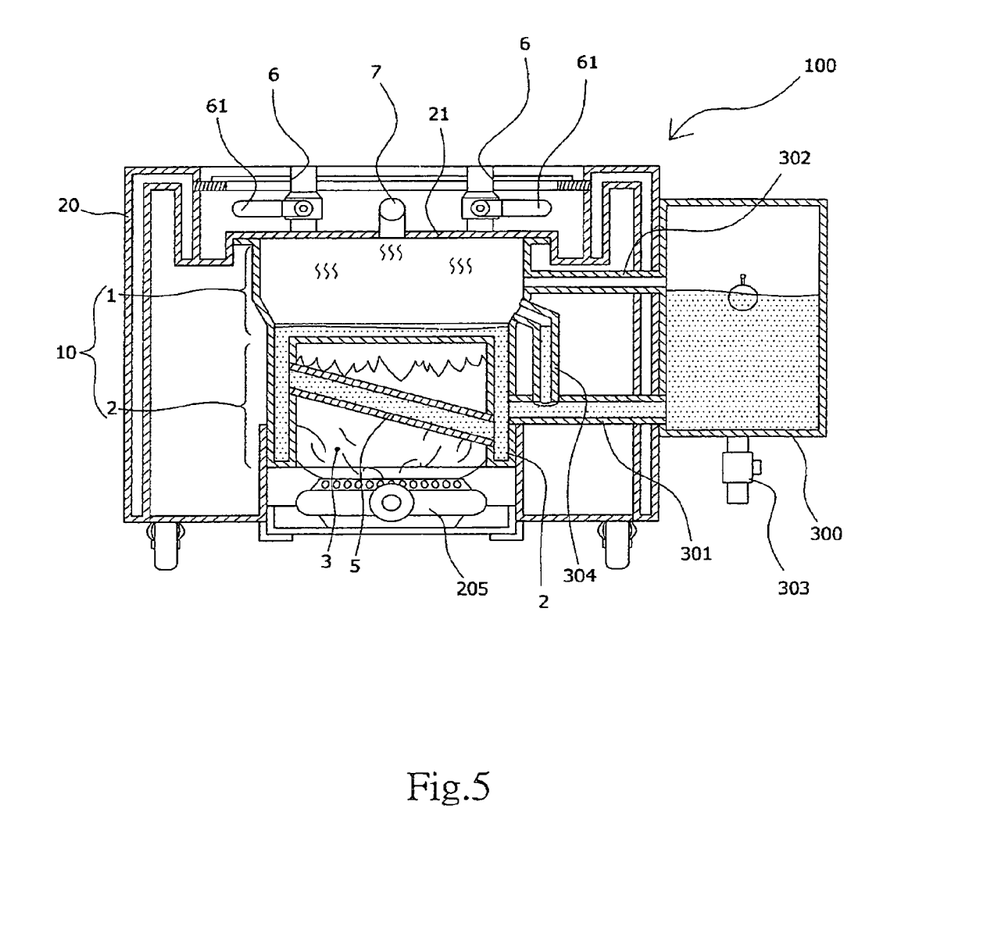
FIG. 5: is a sectional view of the boiler in FIG. 4.

FIGS. 4 to 5 illustrate the second embodiment of the present invention. A steam table (100) contained a boiler (10) that is a sealed boiler capable of being filled with water therein and discharge steam; said boiler (10) has the same structure as the first embodiment, the differences are: the bottom groove (2) protruded downwardly from left and right sides of the upper groove (1) to open the front and rear ends of the concave heating space (3) for forming an open space; said heating space (3) provided a plurality of heated tubes (5) disposed diagonally, whereat both ends of said heated tube (5) are respectively communicated with left and right sides of the bottom groove (2). As the front and rear ends of the heating space (3) are open, the air can flow freely, so that the flame is more exuberant. Furthermore, said heated tube (5) is disposed diagonally, thus, the length is longer than that of the horizontally set heated tubes. When a larger volume and heating area, the water can be boiled more rapidly.

Figure 6:
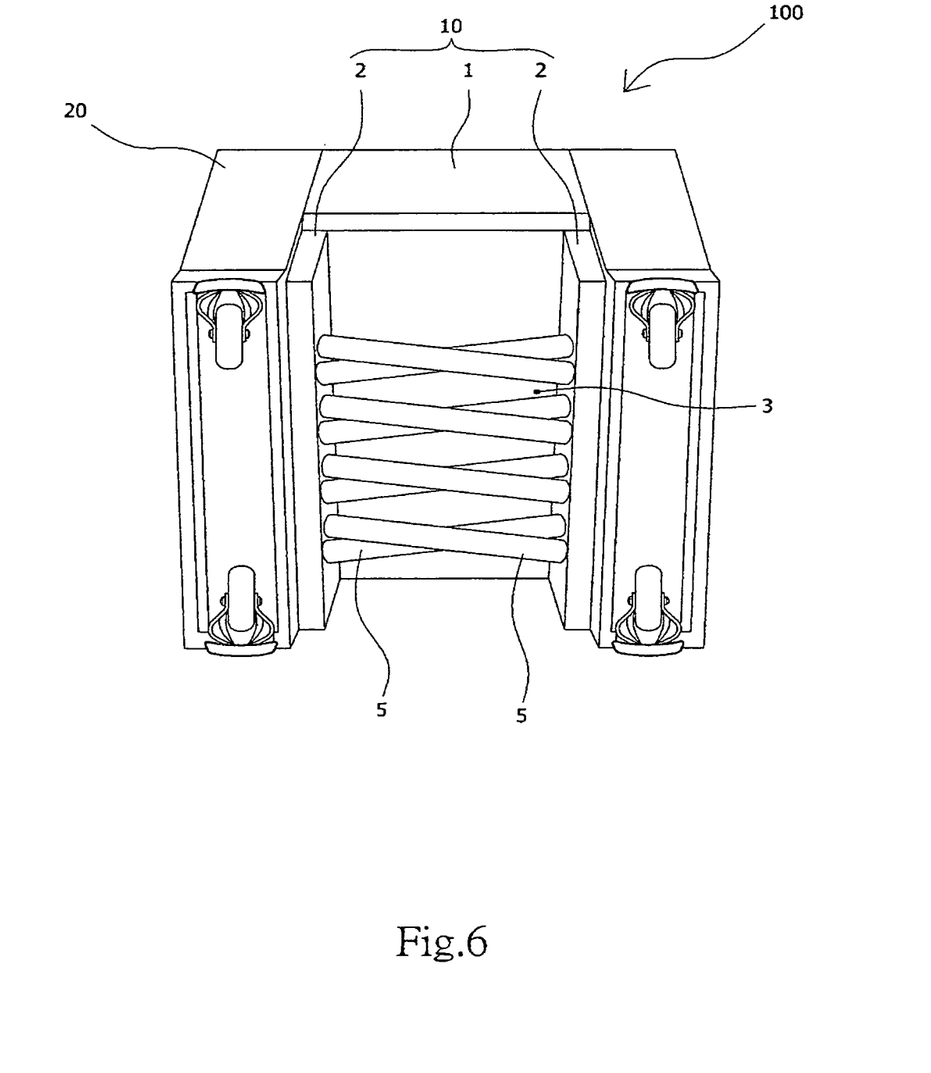
FIG. 6: is a bottom perspective view of steam table, which is the sectional view of the third embodiment.
Figure 7:
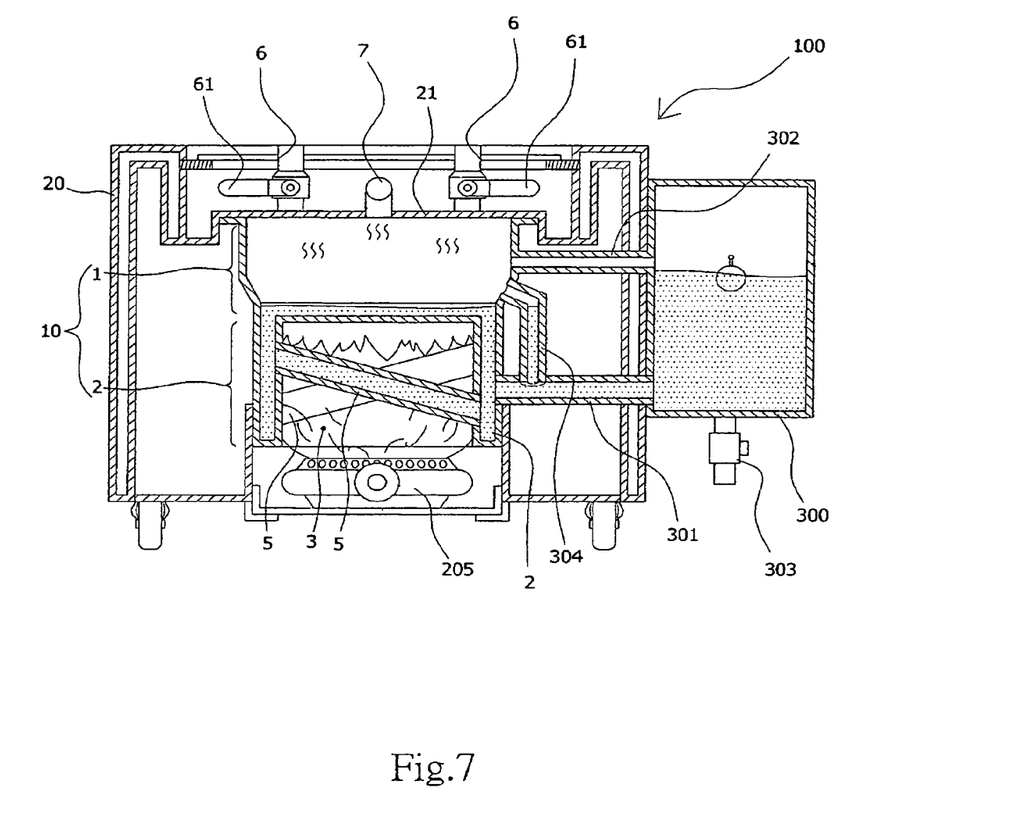
FIG. 7: is a sectional view of the boiler in FIG. 6.

FIGS. 6 to 7 illustrate the third embodiment of the present invention. A steam table (100) contained a boiler (10); its differences with the second embodiment are: the heated tubes (5) are perpendicularly intersected for even heating.

Figure 8:
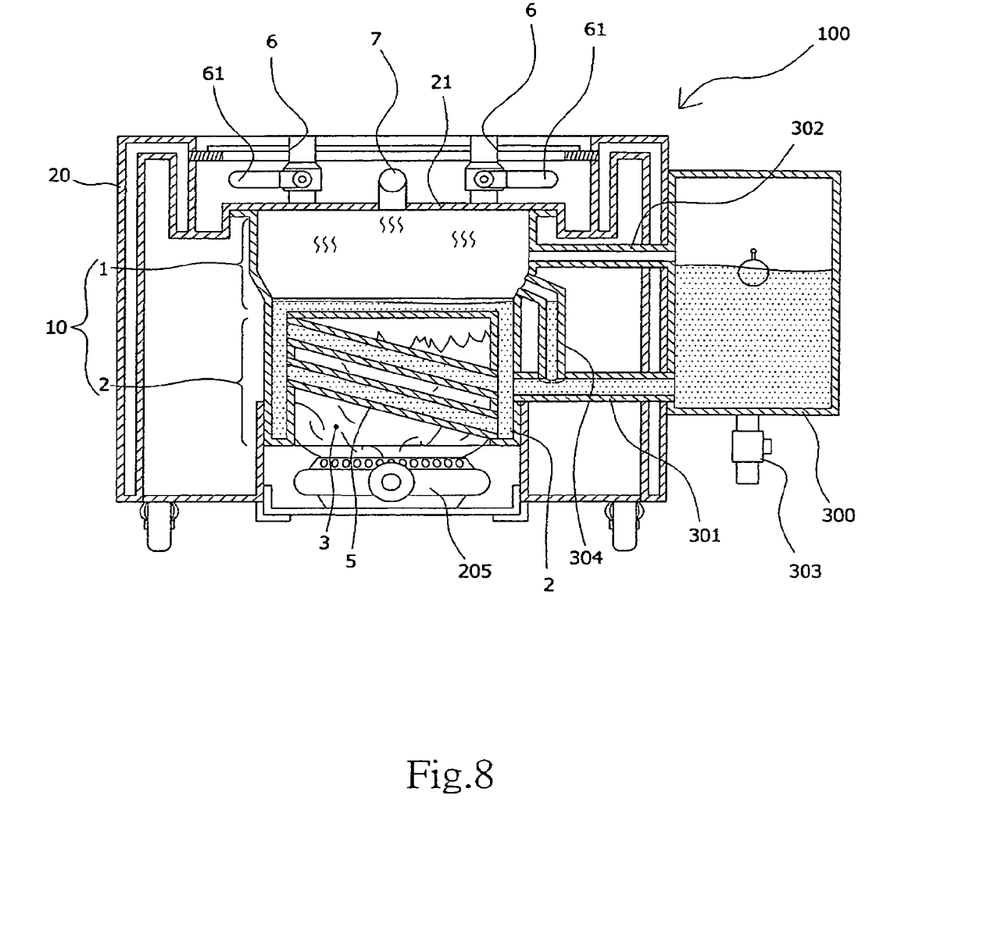
FIG. 8: is a sectional view of the fourth embodiment.

FIG. 8 illustrates the fourth embodiment of the present invention. A steam table (100) contained a boiler (10); its differences with the second embodiment are: the heated tubes (5) are divided into upper layers and lower layers. Accordingly, more heated tubes (5) can increase the heating volume and area so that water can be boiled more rapidly.

Figure 9:
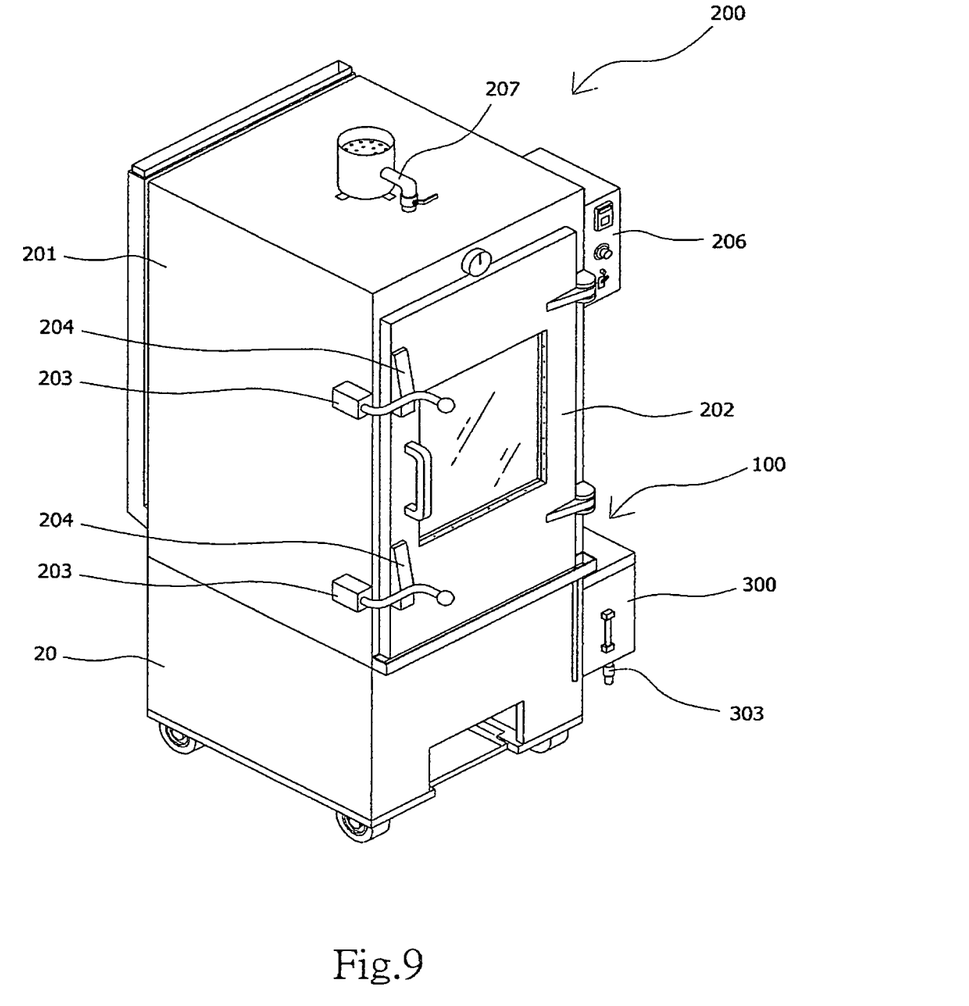
FIG. 9: is a perspective schematic view of steam cabinet.
Figure 10:
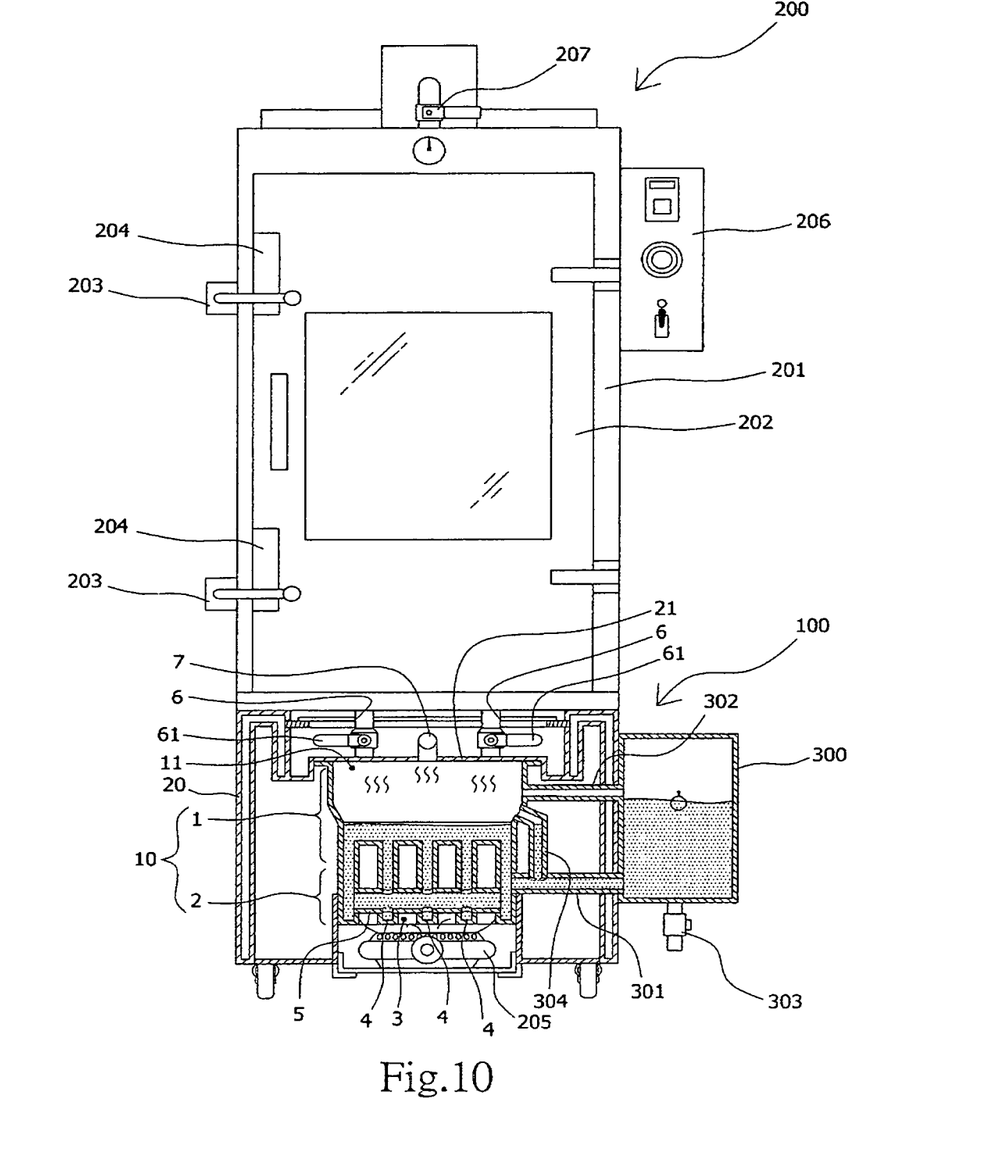
FIG. 10: is a sectional view of part of steam cabinet in FIG. 9, which is the sectional view of the first embodiment.

FIGS. 9 to 10 illustrate a steam cabinet (200), comprising of a low cabinet (20) and a box body (201). Buns and dumplings can be placed inside the box body (201) for steaming. In the front of said box body (201), there is a door cover (202) that can open; on the outer wall of said box body (201), there is a forcing tight grip (203); at the edge of the door cover (202), there is a wedge (204). The forcing tight grip (203) and wedge (204) can tightly close the door cover (202) and box body (201) to prevent the leakage of steam inside box (201). Moreover, a control device (206) is placed thereabove to control the heating time and temperature. The box body (201) communicates with a steam discharge controlling pipe (207). Said box body (201) belongs to the conventional design and thus is not elaborated herein.

Although the invention has been explained in relation to its preferred embodiment, it is to be understood that many other possible modifications and variations can be made without departing from the spirit and scope of the invention as hereinafter claimed.

I claim:

1. A steam heating boiler that is a sealed boiler (10) capable of being filled with water therein and discharge steam, said boiler (10) including a hollow upper chamber (1) thereabove and a hollow bottom chamber (2) therebelow; the volume of an upper part of said upper chamber (1) being larger than the one of an lower part of said upper chamber (1), and a top opening of the upper chamber (1) being sealed, the volume of the hollow bottom chamber (2) protruded downwardly from said lower part of the upper chamber (1), an upper part of said bottom chamber (2) communicated with said lower part of the upper chamber (1) and an lower part of said bottom chamber (2) being sealed, so that water can flow freely inside the upper chamber (1) and bottom chamber (2); moreover, a concave heating space (3) for fire heating formed at an external bottom of said bottom chamber (2), which is characterized in that:
   said bottom chamber (2) formed a rectangle-shaped water storage tank while looking upward, and the heating space (3) is surrounded by the bottom chamber (2) thus forming a concave enclosed space;
   said heating space (3) is provided with a hollow convex groove (4) protruded downwardly from a bottom part of the bottom chamber (2), said convex groove (4) arranged longitudinally and connected with the bottom chamber (2), and both ends of said convex groove (4) communicated with the lower side of the bottom chamber (2), the heating space (3) further including a heated tube (5) perpendicularly crossed with the convex groove (4) and communicated with each other, and both ends of the heated tube (5) connecting with the left and right sides of the bottom chamber (2), so that water can flow freely inside convex groove (4) and heated tube (5).

2. The steam heating boiler defined in claim 1, wherein two or more said convex grooves (4) are equally spaced in parallel; two or more said heated tubes (5) equally are spaced in parallel and perpendicularly crossed with the convex grooves (4) communicated therebetween.

3. The steam heating boiler defined in claim 1, wherein the upper chamber (1) further includes a steam pipe (6) with an adjustment valve (61) and a steam release regulator pipe (7).

4. The steam heating boiler defined in claim 3, wherein said boiler (10) is arranged inside a low cabinet (20) engaged with an automatically filling water tank (300) to form a steam table (100), the bottom part of said tank (300) communicated with the bottom chamber (2) of said boiler (10) through a water filling pipe (301), said water filling pipe (301) communicated with the upper chamber (1) of said boiler (10) through a pressure relief pipe (304), the upper part of said tank (300) communicated with the upper groove (10) of said boiler (10) through a vent pipe (302).

5. The steam heating boiler defined in claim 4, wherein the low cabinet (20) of said steam table (100) includes a box body (201) arranged thereabove for engaging with the steam cabinet (200).

\* \* \* \* \*